(12) United States Patent
Baumann et al.

(10) Patent No.: US 8,101,704 B2
(45) Date of Patent: Jan. 24, 2012

(54) CONTINUOUS POLYMER-ANALOGOUS REACTION OF REACTIVE SILANE MONOMERS WITH FUNCTIONALIZED POLYMERS

(75) Inventors: Frank Baumann, Tittmoning (DE); Wolfram Schindler, Tuessling (DE); Thomas Frey, Burghausen (DE); Achim Schroeder-Ebensperger, Burghausen (DE)

(73) Assignee: Wacker Chemie AG, Munich (DE)

( * ) Notice: Subject to any disclaimer, the term of this patent is extended or adjusted under 35 U.S.C. 154(b) by 880 days.

(21) Appl. No.: 11/917,951

(22) PCT Filed: May 24, 2006

(86) PCT No.: PCT/EP2006/004963
§ 371 (c)(1),
(2), (4) Date: Jun. 19, 2008

(87) PCT Pub. No.: WO2006/136261
PCT Pub. Date: Dec. 28, 2006

(65) Prior Publication Data
US 2010/0016537 A1   Jan. 21, 2010

(30) Foreign Application Priority Data
Jun. 23, 2005 (DE) .......... 10 2005 029 169

(51) Int. Cl.
*C08G 77/06* (2006.01)

(52) U.S. Cl. ............ 528/38; 528/25; 528/28; 528/29; 422/129

(58) Field of Classification Search .......... None
See application file for complete search history.

(56) References Cited

U.S. PATENT DOCUMENTS

| | | | |
|---|---|---|---|
| 3,384,624 A | 5/1968 | Heiss | |
| 4,104,144 A | 8/1978 | Weiss et al. | |
| 4,910,332 A | 3/1990 | Kahl et al. | |
| 5,055,249 A * | 10/1991 | Schmid | 264/236 |
| 5,068,304 A | 11/1991 | Higuchi et al. | |
| 6,015,920 A * | 1/2000 | Schilling et al. | 556/479 |
| 6,121,379 A * | 9/2000 | Yamanaka et al. | 525/106 |
| 6,162,862 A | 12/2000 | Grunbauer et al. | |
| 6,350,824 B1 | 2/2002 | Baumann et al. | |
| 6,410,772 B2 * | 6/2002 | Okuyama et al. | 556/479 |
| 6,498,210 B1 | 12/2002 | Wang et al. | |
| 6,545,087 B1 | 4/2003 | Schmalstieg et al. | |
| 7,319,128 B2 * | 1/2008 | Ziche et al. | 528/29 |
| 7,435,787 B2 * | 10/2008 | Banevicius et al. | 528/85 |
| 7,867,619 B2 * | 1/2011 | Jucker et al. | 428/447 |
| 2004/0204539 A1 | 10/2004 | Schindler et al. | |
| 2005/0119436 A1 | 6/2005 | Ziche et al. | |
| 2006/0189705 A1 | 8/2006 | Stanjek et al. | |
| 2006/0287461 A1 | 12/2006 | Henze et al. | |
| 2010/0209643 A1 | 8/2010 | Henze et al. | |

FOREIGN PATENT DOCUMENTS

| | | |
|---|---|---|
| CN | 1526784 A | 9/2004 |
| DE | 1243807 B | 7/1967 |
| DE | 19849817 A1 | 5/2000 |
| DE | 10355318 A1 | 6/2005 |
| EP | 0931800 B1 | 7/1999 |
| EP | 1535940 A1 | 6/2005 |
| JP | 2002003529 A | 1/2002 |
| JP | 2005501146 A | 1/2005 |
| JP | 2005154779 A | 6/2005 |
| JP | 2006307014 A | 11/2006 |
| WO | 03/018658 A1 | 3/2003 |
| WO | 2004/083271 A1 | 9/2004 |
| WO | 2005/014683 A1 | 2/2005 |

OTHER PUBLICATIONS

Abstract for JP 2006-307014 A (Nov. 2006).*
Machine-generated translation of JP 2005-154779.*
Polyurethane, Kunststoff Handbuch 7 (1983), p. 86-87.
Patent Abstract Corresponding to DE 1243807 B, (Jul. 1967).
Kirk-Othmer, Reactor Technology, Encyclopedia of Chemical Technology, 4th Edition, J. Wiley & Sons, vol. 20, pp. 1007-1059, (1998).
Polyurethane Kunststoff Handbuch 7 (1983), p. 86-87.
Product Information ACCLAIM® 1220 (Jan. 2005).
Reprint of Alpha Silanes—New Building Blocks for High-Performance Coatings Presentation by J. Pfeiffer at the European Coatings Show 2005.
Print of the online—"Medienbibliothek—Wacker Chemie AG" from which "Alpha Silanes—New Building Blocks for High-Performance Coatings Presentation by J. Pfeiffer at the European Coatings Show 2005" was downloaded.
Print of the website: http://www.specialchem4adhesives.com/resources/latest/displaynews.aspx?id=1113.
Römpp Chemie Lexikon, Edt. J. Falbe, M. Regitz; Stuttgart, New York, Georg Thieme Verlag, Edition 10, 1997, vol. 3:H-L.
EU Sicherheitsdatenblatt GENIOSIL XL 42 (Wacker).
Product data sheet GENIOSIL XL 42 (Wacker) Version 1.00 of 30-07-03.

* cited by examiner

*Primary Examiner* — Marc Zimmer
(74) *Attorney, Agent, or Firm* — Brooks Kushman P.C.

(57) ABSTRACT

Functional polymers having silyl end groups are prepared in a continuous process by polymer analogous reaction of a reactive polymer and inter-reactive silane. The polymer products are surprisingly uniform in properties and exhibit higher physicochemical properties as well.

10 Claims, 1 Drawing Sheet

Figure 1:
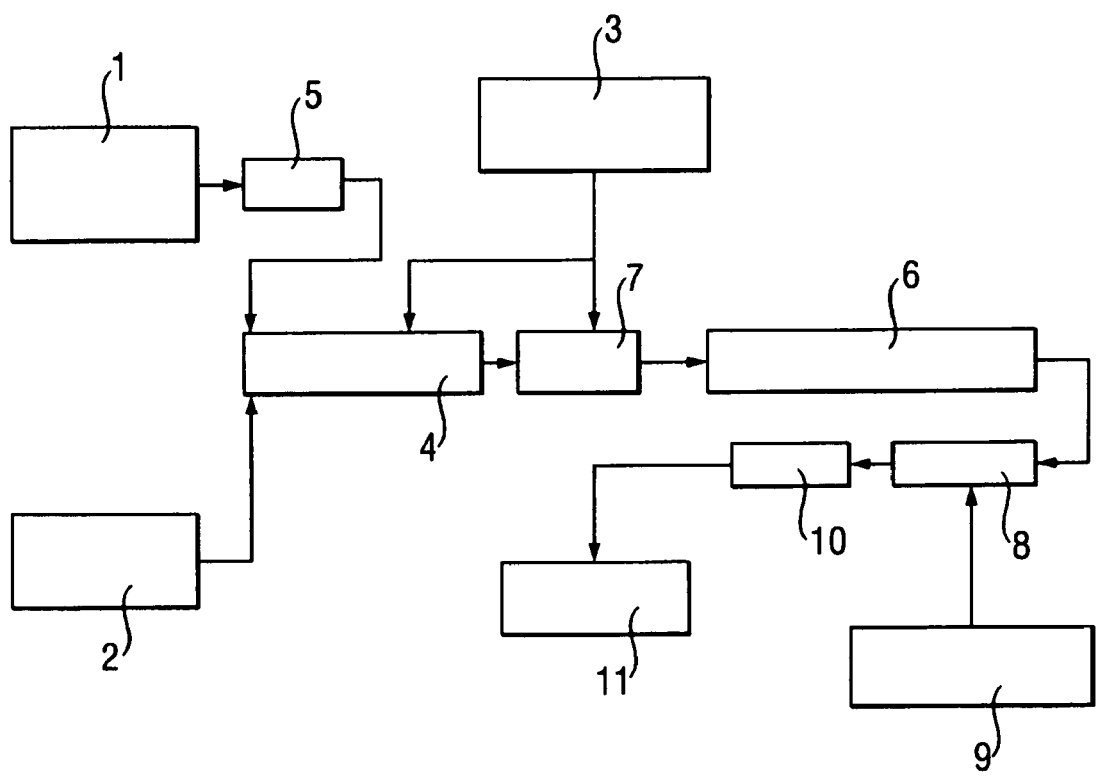

CONTINUOUS POLYMER-ANALOGOUS REACTION OF REACTIVE SILANE MONOMERS WITH FUNCTIONALIZED POLYMERS

CROSS-REFERENCE TO RELATED APPLICATION

This application is the U.S. national phase of PCT Appln. No. PCT/EP2006/004963 filed May 24, 2006 which claims priority to German application DE 10 2005 029 169.4 filed Jun. 23, 2005.

BACKGROUND OF THE INVENTION

1. Field of the Invention

The invention relates to a continuous process for preparing polymers with silane end groups by polymer-analogous continuous reaction of reactive silane monomers with functionalized polymers.

2. Description of the Related Art

The change in the functionalization of oligomers and polymers by polymer-analogous reactions is an important process step in the chemical industry. As a result, it is possible to tailor the properties of polymers to the particular field of use. For example, the reactivity, the crosslinking characteristics, the adhesion, the solubility, the morphology, the thermal stability, etc., can be adjusted. Examples of polymer-analogous reactions are the hydrolysis of polyvinyl acetate to polyvinyl alcohol, the hydrosilylation of polysiloxanes bearing H groups with olefins, the quaternization of polyvinylpyridine. In addition, the functionalization of oligomers and polymers with reactive groups also constitutes an important reaction. Of particular interest here is also the incorporation of monomeric reactive silane groups. In many cases, for this purpose, functionalized polymers such as OH-, NH- or SH-containing polyethers, polyesters, polyurethanes or polysulfides are reacted with isocyanatosilanes, or else isocyanate-functional polymers are capped by simple reaction with aminosilanes.

For some of these polymer-analogous reactions, for example, hydrosilylation, continuous processes have already been described and performed in U.S. Pat. No. 6,350,824.

In this context, continuous processes are superior to batch processes in the following aspects:

uniform product quality, i.e. reduction in the side reactions, short thermal stress on starting materials and products, increased selectivity of the reaction;

high space-time yield, i.e. high quantitative output with simultaneously small reactor holdup, as a result superior to the batch process also in safety and toxicological aspects;

multistage reactions possible without backmixing, i.e. activation and deactivation take place in separate plant parts;

minimization of waste and production cost minimization as a result of minimization and/or absence of solvents in inhomogeneous systems;

mixing of highly viscous products is better in continuous mixers;

a further advantage of continuous processes is that in-line analysis allows the quality of the resulting product to be controlled during the running production process by adjusting reaction parameters such as residence time, temperature profiles, stoichiometry of the components used, etc. In addition, these processes can be optimized in a simpler manner and more efficient raw material use is thus possible.

According to the prior art to date, the functionalization of polymers with isocyanatosilanes or aminosilanes is performed only in batch processes. Typical examples of these reactions are described in EP 931 800 B1, U.S. Pat. No. 5,068,304, DE 198 49 817 or WO 03/018658. None of the processes published to date discusses means of industrial realization and optimization in continuous processes. At the same time, it is common knowledge that, for example, in the preparation of polyurethanes and also silane-terminated polyurethanes, the control of the reaction conditions has an extremely important influence on the product quality. Moreover, in the scale-up of such processes, problems often occur in reproducibility, since, for example, the temperature control and the mixing of the reactants changes.

In the case of end termination with isocyanatosilanes, in addition to the variation in the polymer preparation, further side reactions are also possible which can lead to degradation of the isocyanatosilane, and hence often have the consequence of low functionalization of the polymer. Although these effects can be compensated for by a higher addition of silane, the amounts of the specialty silanes required is thus increased simultaneously, which is in many cases undesired for reasons of cost.

SUMMARY OF THE INVENTION

It was thus an object of the present invention to develop a process which makes such reactions possible in an inexpensive manner and allows the products to be prepared in uniform quality irrespective of the scale up factor. These and other objects are achieved through polymer-analogous continuous reaction involving defined starting species.

DETAILED DESCRIPTION OF THE PREFERRED EMBODIMENT

The invention provides a continuous process for preparing polymers (A) having end groups of the general formula (1)

$$(R^1)_a(R^2)_{3-a}Si\text{—}X\text{-}A\text{-} \qquad (1)$$

by polymer-analogous continuous reaction of linear, branched or crosslinked compounds which contain units of the general formula (2)

$$(Y\text{—})_nR^4 \qquad (2)$$

with compounds of the general formula (3)

$$(R^1)_a(R^2)_{3-a}Si\text{—}X\text{—}B \qquad (3)$$

where

X is a divalent alkylene group which is optionally substituted by fluorine, chlorine, bromine, $C_2$-$C_6$ alkoxyalkyl or cyano groups, has 1-10 carbon atoms and may be interrupted by ether, ester or amine groups or a chemical bond, A is a divalent link group selected from —O—, —S—, —(R³)N—, —(R³)N—CO—N(R³)—, —O—CO—(R³)N—, —(R³)N—CO—O—, —S—CO—(R³)N—, —(R³)N—CO—S—, α)
B is hydrogen when X is a chemical bond and
Y is an optionally substituted alkenyl or alkynyl group, or β)
B is an —N═C═O group and
Y is a group selected from HO—, HS—, H(R³)N— or γ)
B is a group selected from —OH, —SH, —(R³)NH, and
Y is an O═C═N— group or an optionally substituted epoxy group, $R^1$ is an optionally halogen-substituted hydrocarbon radical having 1-10 carbon atoms, is an alkoxy radical —$OR^3$, acetoxy radical —O—CO—$R^3$, oxime radical —O—N=C($R^3$)$_2$ or amine radical —NH—$R^3$, $R^3$ is hydrogen, a linear, cyclic or branched hydrocarbon radical which is optionally substituted by heteroatoms and has 1-18 carbon atoms, an alkyl radical which is interrupted by nonadjacent oxygen atoms and has 1-18 carbon atoms, an alkoxy radial —$OR^5$ or an acetoxy radical —O—CO—$R^5$, $R^4$ is a linear, branched or crosslinked polymer radical, $R^5$ is hydrogen or a linear, cyclic or branched hydrocarbon radical which is optionally substituted by heteroatoms and has 1-18 carbon atoms, a is 0, 1, 2 or 3 and n is an integer of at least 1.

With the inventive continuous process, the necessary individual steps for the preparation of these polymers are surprisingly realized without any problem even in continuous plants.

In particular, with the inventive continuous process, a more uniform conversion of the starting materials is achieved. As a result, a high and uniform degree of functionalization is achieved. This leads to significantly better and more reproducible crosslinking of the polymers. For example, this improves the mechanical properties of cured formulations (higher mechanical strengths, better elasticities, especially higher Shore A hardnesses, etc.). On the other hand, the improved properties can also be utilized in order to increase the range of the formulation. For many cost-sensitive applications, the costs of the polymeric binder are of significance, since the proportion in the formulation is very high. Because it is still possible here to establish sufficiently good properties through addition of cheaper additives and fillers, the improved property profile of the polymers prepared in the inventive continuous process also leads to economic advantages.

The reaction can optionally be performed in the presence of catalysts and further assistants to accelerate the reaction.

The polymers (A) which constitute the $R^4$ radical may be formed from different units. Typically, these are polysiloxanes, polysiloxane-urea/urethane copolymers, polyurethanes, polyureas, polyethers, polyesters, poly(meth)acrylates, polycarbonates, polystyrenes, polyamide, polyvinyl esters or polyolefins, for example polyethylene, polybutadiene, ethylene-olefin copolymer or styrene-butadiene copolymers. It will be appreciated that it is also possible to use any mixtures or combinations of polymers with different main chains.

Particularly suitable for preparing the polymers (A) are aromatic and aliphatic polyesterpolyols and polyetherpolyols, as described many times in the literature. Additionally suitable are polyurethanes prepared on the basis of these polyester and polyether polyols, by reaction with common diisocyanates such as diisocyanatodiphenylmethane (MDI), both in the form of crude or technical MDI and in the form of pure 4,4' and 2,4' isomers or mixtures thereof, tolylene diisocyanate (TDI) in the form of its different regioisomers, diisocyanatonaphthalene (NDI), isophorone diisocyanate (IPDI) or else of hexamethylene diisocyanate (HDI).

Particularly suitable for preparing the polymers (A) are difunctional polyetherpolyols of the general formula —($R^6$O)m-, where $R^6$ may be the same or different and represents optionally substituted hydrocarbon radicals, preferably methylene, ethylene and 1,2-propylene radicals, and m is an integer of from 7 to 600, preferably from 70 to 400 (for example, those commercially available under the brand "Acclaim® 12200" from Bayer AG, Germany, "Alcupol® 12041LM" from Repsol, Spain and "Poly L 220-10" from Arch Chemicals, USA).

X is an optionally halogen-substituted alkyl, cycloalkyl, alkenyl or aryl radical having 1-10 carbon atoms, especially a divalent alkylene group having 1-6 carbon atoms, such as methylene, ethylene, or n-propylene.

$R^1$ is preferably an alkyl or aryl radical having 1-10 carbon atoms, especially from 1 to 4 carbon atoms, such as methyl, ethyl, or n-propyl.

$R^2$ is preferably a methoxy or ethoxy group.

$R^3$ is preferably a linear, cyclic or branched radical having 1-8 carbon atoms, especially an alkyl radical having from 1 to 4 carbon atoms, such as methyl, ethyl, or n-propyl.

$R^4$ is preferably a linear polymer radical. $R^4$ preferably has a mean molecular weight Mw of from 100 to 100,000, especially from 500 to 20,000.

n is preferably from 2 to 1000, especially from 5 to 100.

In a particularly preferred embodiment of the present process, polymers (A) having end groups of the general formula (1) in which A is the —NH—CO—O— group are prepared by reacting linear polymers of the general formula (2) in which Y is the HO— group with isocyanatosilanes of the general formula (3), in which B is the —N=C=O group. In this embodiment, each independently, X is a divalent alkylene group having 1-3 carbon atoms, $R^1$ is a methyl group, $R^2$ is a methoxy or ethoxy group and $R^4$ is a linear, branched polyether, polyester or polyurethane radical.

Examples of isocyanatosilanes of the general formula (3) are isocyanatomethyldimethylmethoxysilane, isocyanatopropyldimethylmethoxysilane, isocyanatomethylmethyldimethoxysilane, isocyanatopropylmethyldimethoxysilane, isocyanatomethyltrimethoxysilane and isocyanatopropyltrimethoxysilane, preference being given to isocyanatomethylmethyldimethyoxysilane, isocyanatopropylmethyldimethoxysilane, isocyanatomethyltrimethoxysilane and isocyanatopropyltrimethoxysilane, and particular preference to isocyanatomethylmethyldimethoxysilane and isocyanatopropylmethyldimethoxysilane.

In a further preferred embodiment of the present process, in which polymers (A) having end groups of the general formula (1) in which A is the —NH—CO—O— group are prepared by reacting linear polymers of the general formula (2) in which Y is the HO— group with isocyanatosilanes of the general formula (3) in which is the —N=C=O group, in a second synthesis step, compounds of the general formula (4)

$$Z-R^7 \qquad (4)$$

are added to deactivate the silane monomers of the general formula (3), where is a functional HO—, HS— or H($R^8$)N— group and $R^7$, $R^8$ are as defined for $R^5$.

The deactivator of the general formula (4) can be selected from a multitude of compounds. The only prerequisite is that the functional groups of the compound can react with the isocyanate groups of the silanes in a simple reaction. Typical compounds are alcohols, for example, methanol, ethanol, isopropanol, butanol or higher alcohols, and also amines, for example methylamine, ethylamine, butylamine or dibutylamine.

The continuous process is illustrated below by way of example in FIG. 1. In this process, a polymeric reactant which contains units of the general formula (2), for example, a polypropylene glycol containing OH groups, is heated and mixed homogeneously with silane of the general formula (3), for example isocyanatosilane, in a mixer 4, activated by metered addition of a catalyst and reacted in the delay vessel 6.

In the process according to the invention, the polymeric reactants which contain units of the general formula (2) from the reservoir vessel 1 and the silanes of the general formula (3) from the reservoir vessel 2, if appropriate further assistants such as catalysts from the reservoir vessel 3, are conveyed continuously into a suitable mixing unit 4, if appropriate by means of a suitable metering device. To heat the polymeric reactants, a heat exchanger 5 may be connected downstream of the reservoir vessel 1. From the mixing unit 4, the reaction mixture is conveyed into a suitable delay device 6. The assistants may also be added by means of a separate mixer 7 which is arranged directly upstream of the delay device 6.

As it passes through the reaction zone in the delay device 6, which is a continuous reactor, the reaction mixture reaches the reaction temperature, reacts and leaves the reaction zone of the delay device 6 again. Thereafter, the reaction mixture can also be admixed with a deactivator from the reservoir vessel 9 in a mixing unit 8, in order to allow any excess monomers remaining to react in the delay device 10. The product can subsequently also be subjected to further process steps such as distillation, filtration, etc. Subsequently, the product is cooled and collected in the product vessel 11.

This reaction principle can be repeated several times, i.e. modular construction is possible. In each reaction part, a reaction independent of the preceding reaction part is possible.

In catalytic processes, catalyst metering is necessary. The catalyst may be metered in, in solid or liquid form or dissolved in a solvent. The catalysts used are guided by the reaction type. Typically they are acidic or basic compounds, transition metals or transition metal complexes, for example, platinum compounds for hydrosilylation, or catalysts which are used for polyurethane preparation, for example dibutyltin dilaurate, dioctyltin dilaurate, dibutyltin diacetyl-acetonate, dibutyltin diacetate or dibutyltin dioctoate, etc., and also titanates, e.g. titanium(IV) isopropoxide, iron(III) compounds, e.g. iron(III) acetylacetonate, zinc compounds, such as zinc acetylacetonate, zinc 2-ethylhexanoate, zinc neodecanoate, or bismuth compounds bismuth 2-ethylhexanoate, bismuth neodecanoate and bismuth tetramethylheptanedionate. In addition, also amines, for example, triethylamine, tributylamine, 1,4-diazabicyclo[2.2.2]octane, 1,8-diaza bicyclo[5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethylphenylamine and N-ethylmorpholine.

In this process, the catalyst can be metered in continuously in different places. The catalyst can be added upstream of the mixing unit 4, in the mixing unit 4 or downstream of the mixing unit 4 in the reaction zone 6. In a further variant, the catalyst may be added continuously and directly to the reaction zone 6 only after the desired reaction temperature of the starting mixture has been attained. The metered addition or catalyst can take place by means of suitable pump systems. Suitable pump systems in this context are microprecision pumps or piston pumps. The amounts of the catalyst metered in can be determined exactly and controlled, for example by means of suitable mass flow meters or balances. Amounts of catalyst added are guided by the catalyst system used and are in the range of 10 ppm-1%, preferably in the range of 10 ppm-0.1%, more preferably of 10 ppm-200 ppm.

Further assistants for the polymer preparation may be additives for adjusting the rheology. Here, a wide variety of different solvents or plasticizers are conceivable, provided that they cannot influence the reaction or also react themselves. Additionally conceivable are also additives which stabilize the finished end product in any way. Typical substances here are light stabilizers, antioxidants, flame retardants, fungicides, but also water scavengers and reactive diluents in the case of use of reactive silane monomers. It is likewise the case here that these substances should influence neither the catalysis nor the preparation of the polymer. The assistants can be added at different points in the process.

The starting materials may be metered in continuously in the quantitative ratio required by means of pumps, pressure lines or suction lines. The quantitative detection can be detected by means of mass flow meters or balances. The starting materials may have temperatures of from $-20°$ C. to $200°$ C. The silanes of the general formula (3) are preferably used within a temperature range of from $0°$ C. to $60°$ C. and more preferably from $10°$ C. to $35°$ C. The polymers with units of the general formula (2) are used preferably within a temperature range of from $40°$ C. to $160°$ C. and more preferably within a temperature range of from 60 to $120°$ C. The heating can be undertaken, for example, in a reservoir vessel or through a heated metering line (hot water, steam heating, electrical heating, etc.).

The starting materials can be metered in, in a mixing zone upstream of the actual mixing unit 4, or directly into the mixing unit 4. The latter variant is preferred. Suitable mixing zones are, for example, tubes with static mixers or a stirred tank which optionally may be heated.

In the case of use of pressure lines and pumps, the entire flow process can be controlled with the pumps or the line pressure, i.e. the residence time of the starting materials in the reaction zone 6 in the continuous reactor is determined via the pump output installed or the line pressure. In a further variant, another pump has been connected downstream of the mixing unit 4 and then determines the delay characteristics of the mixture.

Suitable mixing units 4 are all units which introduce a sufficiently high energy density into the system in order to distribute the starting materials homogeneously within one another. These are, for example, planetary mixers, Pentax mixers, Thorax mixers, dissolvers, centrifugal pumps, etc. i.e. all mixing units which can, for example, also be utilized for emulsion production and are designed for continuous operation. Likewise suitable are micromixers having a channel cross section of from 1 micrometer up to a few mm. The temperature in the mixing unit can be selected freely, or is established of its own accord on the basis of the selected temperature of the starting materials and the energy input of the mixing unit and varies from preferably $0°$ to $250°$ C. Preference is given to a temperature range of from $40°$ C. to $120°$ C., particular preference to a temperature range of from $60°$ to $100°$ C. Optionally, the mixing units may additionally also be heatable.

In the delay zone connected downstream of the mixing unit 4, further mixing can be effected, for example, by means of static mixers or active mixing units. The active stirring tools may be driven externally or by the liquid as it flows by. Further equipment for mixing is, for example, vortex disrupters installed in a fixed manner or so as to be exchangeable. Mixing can also be effected by means of inserted random packings. Suitable random packings are, for example, glass beads, ceramic or hollow glass bodies, etc.

It is possible to use all reactor geometries and shapes, as described, for example, in Kirk-Othmer, Encyclopaedia of Chemical Technology, J. Wiley & Sons, 4th edition, Volume 20, pages 1007 to 1059. Particular preference is given to a cylindrical reactor shape, in which case the ratio of length to diameter may vary as desired, for example, from 1:10 to 1:2500 (microreactor). The position of the reactor is arbitrary. The reactor material may vary from metal through steel-enamel up to glass.

The delay vessel 6 may preferably be operated within a temperature range of from −20° C. to 400° C. More preferably within a range of from 60° C. to 120° C. The heating can be effected by means of suitable heating equipment, such as oil thermostats, steam heaters, hot water heating, electrical heaters, etc.

The delay vessel 6 can be operated at the above-specified operating temperatures with an absolute pressure range of preferably from 1 mbar to 300 bar.

The throughput, i.e. the flow of starting materials and product per unit time, may vary from preferably 10 g/h to 1000 kg/h according to the reactor size, reaction parameters, viscosity of the starting materials and products, reaction temperatures and reaction kinetics.

This flow can be established by means of the pumps, the line pressure or freely adjustable electronic or mechanical control valves at any point in the process. Optionally, it is possible for delay vessel 6 to be followed downstream by a further, optionally continuous delay vessel 10 in which further chemical reactions, for example also the deactivation reaction of reactive silane monomers of the general formula (3) as described above can be performed continuously. For these downstream delay vessels 10, the same specification applies as for the first delay vessel 6, with regard to temperature, pressure and metered additions.

It is preferred that polymers (2) are mixed in a first mixer with isocyanatosilanes (3) and conveyed to the delay vessel (6) in such a manner that back mixing from the delay vessel to the mixer is prevented.

The product quality is preferably monitored by means of the continuous in-line monitoring of the quality of the starting materials as far as necessary and of the reaction products. It is possible for different parameters to be analyzed or measured. Suitable test methods are all of those which, within a sufficiently short time, can detect the raw material quality and/or the conversion of the reaction. These are, for example, spectroscopic methods such as NIR spectroscopy, FT-IR spectroscopy and Raman-FT spectroscopy. Preference is given to monitoring the conversion of the reaction. For example, the residual content of silane monomers of the general formula (3) can be measured. One example here is the monitoring of the isocyanate content, in the case of use of isocyanatoalkylalkoxysilanes.

All above symbols of the above formulae are each defined independently of one another.

In the use examples which follow, all parts and percentage data are based on weight. The examples were carried out at a pressure of the surrounding atmosphere, i.e. at about 1012 mbar, and at room temperature, i.e. at about 21° C. The viscosities were measured at 25° C.

EXAMPLES

Example 1

Noninventive

Preparation of the Silane-Terminated Polymer in a Batch Process
Reaction Procedure:

40.72 kg of an alpha,omega-OH-terminated polypropylene glycol having an OH number of approx. 9.5 and a mean molecular weight of approx. 12,000 a.u. (for example obtainable under the brand Acclaim® Polyol 12200 N from Bayer AG) are placed in a stirred stainless steel apparatus with an anchor stirrer and heated to 80° C. by brief heating, then inertized by cautious evacuation (slight foaming) and breaking of the vacuum with nitrogen. Subsequently, 1.360 kg of isocyanatomethylmethyldimethoxysilane having an NCO content of 25.5% (titration—the calculation of the use amount takes account of the NCO content; obtainable under the brand GENIOSIL® XL 42 from Wacker-Chemie GmbH) are added rapidly from a reservoir and the mixture is homogenized at approximately 80° C. for 45 min. Thereafter, 8.4 g of a mixture of bismuth 2-ethylhexanoate (obtainable from ABCR GmbH & Co. KG) and zinc 2-ethylhexanoate (obtainable from ABCR GmbH & Co. KG) in a ratio of 3:1 are added via a further reservoir. Since the amount of the catalyst is very small, the initial charge is flushed with a little ethyl acetate.

After the catalyst has been added, the reaction mixture warms up only slightly (2-3° C.). The mixture is stirred at approx. 80° C. for one hour and the reaction is monitored by means of IR spectroscopy. If, after the end of the reaction, traces of isocyanate are still detected, it is converted at approx. 55° C. by addition of methanol in order to obtain an isocyanate-free end product.

As the measurement of the NCO content before the methanol has been added shows, the reaction gives rise to relatively variable values. In the case of 1b, more than 0.2% silane remains, whereas all of it reacts in case 1c. This indicates either complete reaction or side reactions which lead to degradation of the NCO-silane (e.g. cyanurates, biuret formation).

Determination of the properties of the polymers in three batch tests:

|  | 1a | 1b | 1c |
|---|---|---|---|
| NCO titration for silane | | | |
| NCO content in silane | 24.0% | 23.6% | 25.1% |
| NCO determination in polymer IR method | | | |
| Residual NCO content before methanol | 0.089% | 0.221% | <0.002% |
| NCO content after methanol | <0.002% | <0.002% | <0.002% |
| GPC (polystyrene standard) | | | |
| Mw | 20.800 g/mol | 20.000 g/mol | 22.800 g/mol |
| Mn | 18.700 g/mol | 18.000 g/mol | 19.500 g/mol |
| Polydispersitate | 1.1 | 1.1 | 1.2 |
| Mechanical testing to DIN 53504 Polymer + 1% aminopropyltrimethoxysilane—cured at 23° C./50% rh for 14 days | | | |
| Shore A | 38 | 37 | 36 |
| 50% modulus | 0.57 N/mm$^2$ | 0.48 N/mm$^2$ | 0.51 N/mm$^2$ |
| 100% modulus | | 0.70 N/mm$^2$ | — |
| Breaking strength | 0.7 n/mm$^2$ | 0.6 N/mm$^2$ | 0.6 N/mm$^2$ |
| Elongation at break | 70% | 82% | 77% |

Example 2

Inventive

Preparation of the Silane-Terminated Polyether by the Continuous Process
Reaction Procedure—Process Description:

A barrel lifter with attached pump is used to meter 18.6 kg/h of an alpha, omega-OH-terminated polypropylene glycol having an OH number of approx. 9.5 and a mean molecular weight of approx. 12,000 a.u. (for example obtainable under the brand Acclaim® Polyol 12200 N from Bayer AG) into a dynamic mixer (from Pentax) directly into the mixing chamber. The metered addition is controlled via the pump flow. From a second reservoir, 0.65 kg/h of isocyanatomethylmethyldimethoxysilane having an NCO content of 25.5% (titration—the calculation of the amount used takes account of the NCO content; obtainable under the brand GENIOSIL® XL 42 from Wacker-Chemie GmbH) are metered simultaneously into the mixing vessel. The feed line into the mixer is just downstream of the feed line for the polyether. The metered addition is adjusted via a pump with a needle valve, and the variation of the weight of the charge with time is checked simultaneously. The mixture is heated to approx. 50 60° C. as a result of the energy input of the dynamic mixer. The reaction mixture is subsequently pumped into a 25 l stirred apparatus and heated there to approx. 80-90° C. The input and the output in the stirred vessel are adjusted such that, after the reaction has been started up, a stable fill level of approx. 20 l is established. In order to prevent additional mixing to the dynamic mixer, this stirred apparatus is not stirred. This substantially prevents backmixing, for example, and only the homogeneous distribution of the reactants in the dynamic mixer is then crucial for the product properties. At the outlet of the stirred apparatus is disposed a second dynamic mixer (from Lipp). The catalyst mixture is now metered into this mixing chamber at approx. 18 g/h (mixture of bismuth 2-ethylhexanoate (obtainable from ABCR GmbH & Co. KG) and zinc 2-ethylhexanoate (obtainable from ABCR GmbH & Co. KG) in a ratio of 3:1). Since the amount of the catalyst metered in is very small, an HPLC metering pump (for example, from Knauer) is used for this purpose, since it is possible here to establish very small metering rates without any problem. The reactive mixture is now introduced into a heated delay zone composed of a stainless steel tube of length approximately 18 m and diameter 1.5 inches and a stainless steel stirred apparatus (40 liters)—which is likewise not stirred—for continued reaction. The streams and the fill levels in the stirred apparatus are selected such that the residence times equate to those of the batch tests. At the outlet of the stainless steel stirred apparatus, monitoring of the reaction by sampling is possible. If traces of isocyanate are still detected as it proceeds, they can still, by virtue of a further metering means, be reacted with methanol at approx. 55° C. by means of a static mixer in order to obtain an isocyanate-free end product here, too.

The products from the continuous method, compared to the batch tests, have a significantly more reproducible conversion of the NCO-silane. In all cases, a residual content of approx. 0.1% remains, which varies significantly less than in the case of the comparative examples. The products exhibit a tendency toward higher breaking strengths and significantly higher Shore A hardnesses. The latter have been found to be a very good measure for the crosslinking reaction of the polymers.

Determination of the properties of the polymers in five samples successive in time in the continuous method:

|  | 2a | 2b | 2c | 2d | 2e |
|---|---|---|---|---|---|
| NCO titration for silane | | | | | |
| NCO content in silane [%] | 24.8 | 24.6 | 23.6 | 25.3 | 25.3 |
| NCO determination in polymer IR method | | | | | |
| Residual NCO content before methanol [%] | 0.115 | 0.112 | 0.105 | 0.089 | 0.149 |
| NCO content after methanol [%] | <0.0016 | <0.002 | <0.002 | <0.002 | <0.0016 |
| GPC (polystyrene standard) | | | | | |
| Mw [g/mol] | 20.400 | 20.000 | 19.900 | 21.200 | 21.300 |
| Mn [g/mol] | 16.800 | 17.600 | 17.400 | 18.800 | 18.900 |
| Polydispersity | 1.2 | 1.1 | 1.1 | 1.1 | 1.1 |
| Mechanical testing to DIN 53504 Polymer + 1% aminopropyltrimethoxysilane— cured at 23° C./50% rh for 14 days | | | | | |
| Shore A | 41 | 41 | 41 | 41 | 40 |
| 50% modulus [N/mm²] | 0.59 | 0.58 | 0.61 | 0.63 | 0.60 |
| 100% modulus | — | — | — | — | — |
| Breaking strength [N/mm²] | 0.7 | 0.7 | 0.7 | 0.7 | 0.7 |
| Elongation at break | 70% | 75% | 68% | 70% | 76% |

The invention claimed is:

1. A continuous process for preparing polymers (A) having end groups of the formula (1)

$$(R^1)_a(R^2)_{3-a}Si\text{—}X\text{—}A\text{—} \tag{1}$$

comprising continuously reacting by polymer-analogous reaction of linear, branched or crosslinked compounds comprising units of the formula (2)

$$(Y\text{—})_n R^4 \tag{2}$$

with compounds of the formula (3)

$$(R^1)_a(R^2)_{3-a}Si\text{—}X\text{—}B \tag{3}$$

where

X is a divalent alkylene group optionally substituted by fluorine, chlorine, bromine, $C_2$-$C_6$ alkoxyalkyl or cyano groups, has 1-10 carbon atoms, and is optionally interrupted by ether, ester or amine groups or a chemical bond, A is a divalent linking group selected from the group consisting of —(R³)N—CO—N(R³)—, —(R³)N—CO—O—, and —(R³)N—CO—S—, wherein B is an —N=C=O group and Y is a group selected from the group consisting of HO—, HS—, H(R³)N— and mixtures thereof, or R¹ is an optionally halogen-substituted hydrocarbon radical having 1-10 carbon atoms, R² is an alkoxy radical —OR³, acetoxy radical —O—CO—R³, oxime radical —O—N=C(R³)₂ or amine radical —NH—R³, R³ is hydrogen, a linear, cyclic or branched hydrocarbon radical which is optionally substituted by heteroatoms and has 1-18 carbon atoms, an alkyl radical which is interrupted by nonadjacent oxygen atoms and has 1-18 carbon atoms, an alkoxy radial —OR⁵ or an acetoxy radical —O—CO—R⁵, R⁴ is a linear, branched or crosslinked polymer radical, R⁵ is hydrogen or a linear, cyclic or branched hydrocarbon radical which is optionally substituted by heteroatoms and has 1-18 carbon atoms, a is 0, 1, 2 or 3 and n is an integer of at least 1, wherein polymers (A) are prepared by reacting linear polymers of the formula (2) with isocyanatosilanes of the formula (3) and, in a second synthesis step, compounds of the formula (4)

$$Z\text{-}R^7 \tag{4}$$

are added to deactivate silane monomers of the formula (3), where

Z is a functional HO—, HS— or H(R$^8$)N— group and 3 R$^7$, R$^8$ are as defined for R$^5$.

2. The process of claim 1, wherein R$^4$ has a mean molecular weight Mw of from 100 to 100,000.

3. The process of claim 1, wherein n is from 2 to 1000.

4. The process of claim 1, wherein linear polymers of the formula (2) in which Y is the HO— group and R$^4$ is a polyether, polyester or polyurethane radical are used.

5. The process of claim 1, wherein R$^1$ is an alkyl or aryl radical having 1-10 carbon atoms.

6. The process of claim 1, wherein R$^2$ is a methoxy or ethoxy group.

7. The process of claim 1, wherein R$^3$ is an alkyl radical having from 1 to 4 carbon atoms.

8. A continuous process for preparing polymers (A) having end groups of the formula (1)

comprising continuously reacting by polymer-analogous reaction of linear, branched or crosslinked compounds comprising units of the formula (2)

with compounds of the formula (3)

where

X is a divalent alkylene group optionally substituted by fluorine, chlorine, bromine, $C_2$-$C_6$ alkoxyalkyl or cyano groups, has 1-10 carbon atoms, and is optionally interrupted by ether, ester or amine groups or a chemical bond, A is a divalent linking group selected from the group consisting of —O—, —S—, —(R$^3$)N—, —(R$^3$)N—CO—N(R$^3$)—, —O—CO—(R$^3$)N—, —(R$^3$)N—CO—O—, —S—CO—(R$^3$)—, and —(R$^3$)N—CO—S—, wherein β)
   B is an —N=C=O group and
   Y is a group selected from the group consisting of HO—, HS—, H(R$^3$)N— and mixtures thereof, or γ)
   B is a group selected from the group consisting of —OH, —SH, —(R$^3$)NH, and mixtures thereof, and
   Y is an O=C=N— group or an optionally substituted epoxy group, R$^1$ is an optionally halogen-substituted hydrocarbon radical having 1-10 carbon atoms, R$^2$ is an alkoxy radical —OR$^3$, acetoxy radical —O—CO—R$^3$, oxime radical —O—N=C(R$^3$)$_2$ or amine radical —NH—R$^3$, R$^3$ is hydrogen, a linear, cyclic or branched hydrocarbon radical which is optionally substituted by heteroatoms and has 1-18 carbon atoms, an alkyl radical which is interrupted by nonadjacent oxygen atoms and has 1-18 carbon atoms, an alkoxy radial —OR$^5$ or an acetoxy radical —O—CO—R$^5$, R$^4$ is a linear, branched or crosslinked polymer radical, R$^5$ is hydrogen or a linear, cyclic or branched hydrocarbon radical which is optionally substituted by heteroatoms and has 1-18 carbon atoms, a is 0, 1, 2 or 3 and n is an integer of at least 1, wherein polymers (2) are mixed in a first mixer with silanes (3) and conveyed to a delay vessel in such a manner that back mixing from the delay vessel to the mixer is prevented.

9. The process of claim 8, wherein a catalyst is employed, and a mixture of polymers (2) and isocyanatosilanes (3) are introduced without catalyst into an intermediary vessel, and the mixture is withdrawn from the intermediary vessel, mixed with catalyst in a second mixer, and introduced into the delay vessel.

10. The process of claim 8, wherein the compounds comprising units of the formula (2) and compounds of the formula (3) are continuously introduced into a mixer and mixed therein to form a mixture; the mixture is then introduced into a delay vessel and continuously withdrawn from the delay vessel; and following withdrawal from the delay vessel a catalyst is added and components of the mixture are reacted to form a product polymer (A).

* * * * *